United States Patent Office 3,751,558
Patented Aug. 7, 1973

3,751,558
PROCESS OF SEPARATING COBALT FROM NICKEL BY MEANS OF AMMONIA
Ranko P. Crnojevich, Arvada, and Donald F. Lowe, Lakewood, Colo., assignors to American Metal Climax, Inc., New York, N.Y.
Filed Jan. 14, 1972, Ser. No. 217,761
Int. Cl. C01g 51/00, 53/00
U.S. Cl. 423—144                    15 Claims

ABSTRACT OF THE DISCLOSURE

A method is provided for separating nickel from cobalt contained in nickel-cobalt acid solutions whereby to produce a highly enriched nickel product low in cobalt wherein the nickel-cobalt acid solution is treated at ambient temperature with a predetermined amount of ammonia to produce a nickel-ammonia complex, an ammonium acid-salt and a cobalt-containing precipitate or concentrate which is separated from the solution, the ammonium ion concentration of the acid-salt being maintained below 0.3 mole per liter. The nickel is thereafter recovered from the solution. In its preferred aspects, the solution, after removal of the cobalt-containing precipitate, is heated to an elevated temperature of at least about 50° C. to form a second cobalt-containing precipitate which is separated from the solution, a highly enriched nickel product being thereafter recovered from the solution by known means, such as in the form of nickel hydroxide, nickel oxide, metallic nickel powder, or other form.

---

This invention relates to the hydrometallurgy of nickel and cobalt and to a method for producing nickel solutions low in cobalt content and, in particular, to a method for separating nickel from nickel-cobalt acid solutions, such as sulfate, chloride, nitrate, acetate solutions and the like, especially solutions obtained in the leaching of nickel-containing materials, for example, leached oxidic materials, such as ores, oxidized sulfide concentrates, hydroxide concentrates, and the like.

RELATED U.S. APPLICATION

In related copending application Ser. No. 118,689 filed Feb. 25, 1971, assigned to the same assignee, a method is disclosed for separating nickel from cobalt in nickel-cobalt acid soltuions. The cobalt is selectively precipitated from solution by adding predetermined amounts of ammonia. The amount of the ammonium sulfate formed by the several reactions in the solution should be maintained below 20 grams per liter, preferably below 10 grams per liter (g./l.), in order to assure as high a rejection of cobalt from the solution as possible, especially after boiling the solution following a first cobalt-precipitation step. The presence of ammonium acid-salt above 10 or 20 grams per liter concentration has been found to have an inhibiting effect on the precipitation of cobalt.

In treating nickel-cobalt sulfuric acid solutions for the recovery of cobalt therefrom, ammonia is added in an amount sufficient to form a cobalt-containing precipitate while maintaining substantially the bulk of the nickel in solution as ammine complexes. The amount of ammonia added to the solution preferably ranges from about 2 to 6 moles of ammonia to one mole of nickel and, preferably, from about 3 to 5 moles of ammonia to one mole of nickel. As stated hereinabove, the ammonium sulfate formed by the reactions in the solution should be maintained below 20 grams per liter of solution. The cobalt-containing precipitate is separated from the solution and the nickel subsequently recovered from the filtrate.

It is desirable, following the removal of the cobalt-containing precipitate from the solution, to heat the nickel filtrate to at least about 50° C., for example, to boiling whereby to produce an additional or second cobalt-containing precipitate, while further enriching the solution in nickel relative to the cobalt content. The second cobalt containing precipitate which contains a greater percentage of nickel relative to the percent cobalt than the first precipitate is recycled to the starting nickel-cobalt acid solution where it is dissolved before treatment with ammonia.

The starting nickel-cobalt acid solutions may contain anywhere from about 10 to 75 grams/liter (g./l.) of nickel, 1 to 10 g./l. of cobalt and sufficient acid to provide a pH ranging up to about 7, for example, pH's ranging from about 1.5 to 6. The pH after the ammonia addition may range from about 8 to 11.

BACKGROUND OF THE INVENTION

Nickel and cobalt are generally found together in natural-occurring minerals and, because conventional ore dressing methods do not effect a separation of the two, both metals generally appear together in solutions resulting from the leaching of nickel and cobalt-containing materials, such as leached oxide ores, sulfide concentrates and the like.

In recent years, several hydrometallurgical methods have been proposed for the recoverey of nickel and/or cobalt from lateritic limonitic ores. One method in particular resides in using aqueous sulfuric acid as the leachant at high temperature under elevated pressure, the raw ore being prepared in a finely divided state, then forming a slurry thereof at about 10% to 20% solids which is thereafter concentrated by settling and decanting in thickeners to produce an underflow having a concentration of about 30% to 50% solids. The concentrated slurry is heated in an autoclave by means of direct high pressure steam to a high temperature at which the leaching or other recovery treatment is carried out, usually above 400° F., e.g. about 475° F., at a pressure of about 525 p.s.i.g. in the presence of sulfuric acid to solubilize the nickel and cobalt present in the slurried ore. Following leaching in the autoclave, the leached pulp is cooled and preferably washed by countercurrent decantation and the resulting acid leach liquor then treated with a neutralizing agent [$Mg(OH)_2$, coral mud, or the like] to raise the pH to, for example, 2.5 to 2.8 for the sulfide precipitation of nickel and cobalt. The leach liquor is brought to a temperature of about 250° F. and the nickel and cobalt precipitated as sulfides with $H_2S$ at pressures of up to about 150 p.s.i.g., using nickel as seed material.

The sulfide precipitate is washed and thickened to about 65% solids and then oxidized at about 350° F. and a pressure of about 700 p.s.i.g. in an autoclave in 1% sulfuric acid. Ammonia is added as a neutralizing agent to the nickel-cobalt soltuion to raise the pH to a level (e.g. 5.3), using air as an oxidant, to precipitate any iron, aluminum or chromium carried over as an impurity during leaching. After separating the solution from the precipitate, any copper, lead or zinc present therein is removed by precipitation as a sulfide, using $H_2S$ as the precipitant, the solution being first adjusted with acid to lower the pH to about 1.5. The sulfide precipitate is then separated from the solution and the solution adjusted with ammonia to prepare it for the recovery of metallic nickel. The adjusted nickel feed solution containing about 40 to 50 grams per liter of nickel and some cobalt is reduced with hydrogen in an autoclave at about 375° F. and 650 p.s.i.g. using nickel powder as seed material, the barren liquor remaining going to cobalt recovery using known methods. However, some of the cobalt appears in the reduced nickel product.

Among other methods proposed and/or commercially used for separating cobalt from nickel are included cobalt sulfide precipitation from ammonia-ammonium carbonate solutions, cobalt separation from aqueous sulfuric acid solutions by means of nickelic hydroxide, and the separation of cobalt from nickel using the pentammine process described in U.S. Pats. No. 2,767,053 and No. 2,767,054, the cobalt being thereafter preferentially recovered in the metallic state by hydrogen reduction.

While the foregoing methods provided an acceptable nickel-product, provided the end use tolerated the presence of cobalt in the nickel, these methods in and of themselves had certain limitations insofar as the production of a pure nickel product was concerned.

For example, the recovery of nickel by the hydrogen reduction of nickel-cobalt solutions was not selective enough to meet new specification requirements for high purity nickel. The sulfide and the pentammine precipitation processes are generally limited to specific nickel-cobalt bearing solutions, the sulfide precipitation method generally requiring the use of significant amounts of a sulfidizing agent (e.g. $H_2S$). The nickelic hydroxide procedure is quite expensive and generally requires considerable amounts of caustic sodia and oxidizing agents. Both the nickelic hydroxide and the sulfide precipitation processes usually result in significant loss of nickel together with the precipitated cobalt in that the cobalt-containing precipitate contains more nickel than cobalt.

The present invention provides an improved method of separating cobalt from nickel-cobalt solutions.

OBJECTS OF THE INVENTION

It is a object of this invention to provide an improved process for separating cobalt from nickel values of various nickel-cobalt bearing materials, e.g. nickel and cobalt-bearing acid solutions.

Another object is to provide a process involving the separation of cobalt from nickel and produce nickel solutions very low in cobalt content, with nickel to cobalt ratios in the solution of preferably at least 1000:1 and higher.

A further object is to provide a process for producing an enriched nickel product containing less than 0.3% cobalt and, preferably, less than 0.1% by weight of cobalt.

A still further object is to provide a process for producing high purity nickel from nickel-containing materials, such as ores, sllfide concentrates, and the like.

These and other objects will more clearly appear when taken in conjunction with the following disclosure and the accompanying drawing, wherein.

STATEMENT OF THE INVENTION

Figure 1:
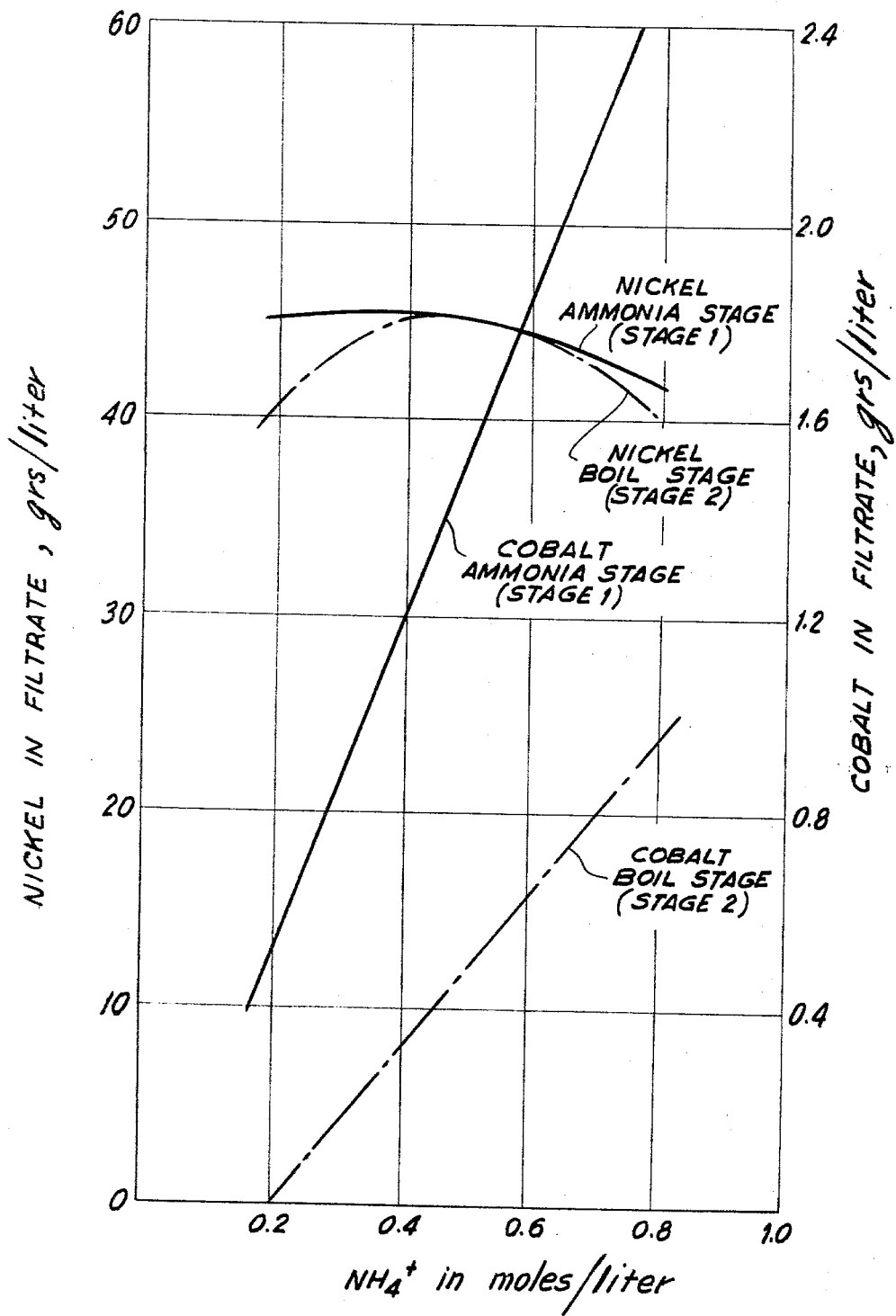
FIG. 1 depicts curves showing the effects of increasing ammonium ion concentration on the amount of cobalt retained in the ammonia-treated nickel-cobalt solution before and after boiling of said solution.

Stating it broadly, the invention resides in a method of separating cobalt from nickel-cobalt acid solutions to which ammonia is added in amounts sufficient to form a cobalt-containing precipitate or concentrate while maintaining substantially the bulk of the nickel in solution as ammine complexes and while controlling the amount of ammonium acid-salt formed in the solution to a level corresponding to below 0.3 mole, and preferably below 0.1 mole, of ammonium ions per liter (m.p.l.) of solution to assure a relatively high recovery of cobalt from the solution. Preferably boiling the solution after removal of the precipitate, additional cobalt is precipitated to provide a nickel-containing filtrate from which a highly enriched nickel-containing product is recovered.

The amount of ammonium acid-salt in solution should be maintained as low as possible to assure a high purity nickel product. This is preferably achieved by adding an hydroxyl ion-yielding substance stoichiometrically calculated or as an excess if complete reaction does not occur to maintain the ammonium ion of the ammonium acid-salt to below 0.3 mole and, preferably, below 0.1 m.p.l. Examples of such substances are hydroxyl ion-yielding anionic ion-exchange reagents, alkali metal hydroxides, such as sodium, potassium and lithium hydroxides, and alkaline earth metal and other metal hydroxides such as calcilm hydroxide, barium hydroxide, strontium hydroxide and the like with calcium hydroxide and sodium hydroxide being particularly preferred.

Thus, the novel feature of the process resides in the separation of cobalt from nickel by means of the selective precipitation of cobalt with ammonia. The amount of ammonia added usually is predetermined on the basis of the total ammonia to nickel mole ratio generally ranging from about 2 to 6. The process is characterized by optimum reproducibility, is simple to control, requires low investment costs, and provides a nickel-containing solution from which a highly enriched nickel product can be produced, particularly a nickel-containing solution in which the nickel to cobalt ratio may exceed 1000:1 and even exceed 2000:1. In this connection, the process is very economical.

The term "ammonia" used herein includes liquid or gaseous ammonia, ammonium hydroxide and those ammoniacal solutions equivalent in behavior to ammonia.

The cobalt-containing precipitate obtained by means of the invention results in a low nickel co-precipitation loss, the ratio of nickel to cobalt in the cobalt concentrate ranging anywhere from about 0.3 to 1.5 parts of nickel to 1 part of cobalt.

The method can be used directly on various acidic aqueous nickel-cobalt bearing solutions in which the nickel to cobalt ratio can range, for example, from 1:1 to as high as 100:1, including such acid solutions as sulfuric, nitric, hydrochloric and acetic and the like solutions. It is especially suitable for processing nickel-cobalt sulfuric acid solutions obtained by the leaching of lateritic ores, metal scrap, nickel sulfide matte and nickel sulfide concentrate. The acid solutions generally have a pH ranging up to about 1.5 to 6.0. The cobalt concentrate obtained as the by-product can be easily processed by well known techniques to obtain pure cobalt metal, the occluded nickel being reclaimable by recycling into the main process. The detail aspects of the invention are as follows.

DETAILS OF THE INVENTION

A nickel-cobalt sulfate solution containing varying concentrations of free acid (such as sulfuric, hydrochloric, nitric and acetic acids, at a pH of about 1.5 to 6 or higher) any ammonium acid-salt present is treated with a predetermined amount of ammonia at an ambient temperature in the range of 0° C. to 50° C. and preferably at about 18° C. to 35° C. for a time sufficient to effect the precipitation of cobalt, that is, a cobalt-containing precipitate which appears as a "blue compound." Generally, over 90% of the nickel remains in the solution while aobut 5 to 10% of the nickel tends to co-precipitate with the cobalt which apparently is a hydroxide or a basic salt, e.g., basic sulfate, chloride, nitrate salts and the like.

Following the first cobalt-precipitating step, the precipitate is removed or left in solution and a hydroxyl ion-yielding substance, e.g. calcium hydroxide, preferably added to the filtrate or slurry, the amount of calcium hydroxide being predetermined to react with the ammonium acid-salt to form aqueous ammonia, water and a neutral salt and thus decrease the ammonium ion concentration of the acid-salt to below 0.3 m.p.l. and, preferably, below 0.1 m.p.l. The use of calcium hydroxide is advantageous in that it also serves to remove the sulfate ion as a calcium sulfate precipitate. Thus, calcium hydroxide serves a two-fold function; it acts as a sulfate remover and also decreases the ammonium ion concentration. Any excess calcium ions in solution can be substantially removed by bubling $CO_2$ in the solution to form insoluble $CaCO_3$.

The predetermined amount of ammonia added to complex the nickel ion and precipitate the cobalt is correlated generally to range from about 2 to 6 moles of ammonia to one mole of nickel in the solution, and preferably from about 3 to 5 moles to one of nickel, 4 moles being preferred.

The presence of a small concentration of ammonium ions below 0.3 m.p.l. (below 20 g./l. ammonium sulfate) tends to depress nickel coprecipitation to some extent, while an ammonium ion concentration of over 0.8 m.p.l. (e.g., over 50 g./l. of ammonium sulfate) substantially inhibits separation of the nickel and cobalt. Therefore, it is advantageous to maintain the ammonium ion concentration of the acid-salt in solution as low as possible, such as below 0.3 m.p.l. and even below 0.15 or 0.1 m.p.l. It has been found beneficial to exclude air from the reaction. The cobalt precipitate or concentrate, which is believed to comprise mostly cobaltous hydroxide, generally contains more cobalt than nickel at a ratio of cobalt to nickel of about 1.2 to 1 to 5:1.

The solution treated in accordance with the invention may contain about 10 to 75 g./l. of nickel and 0.1 to 30 g./l. of cobalt.

The cobalt in the feed solution (that is, the nickel solution) can be reduced from a range of about 30 to 0.1 g./l. of cobalt to a range of about 0.5 to 0.03 g./l. respectively, in the purified filtrate. By means of the ammonia and the subsequent hydroxide additions, the nickel to cobalt ratio in the nickel filtrate solution can be raised to more than 1000:1. The nickel filtrate can be further enriched by heating it to a temperature of at least about 50° C., for example, at a temperature from about 50° C. to the boiling point thereof. This results in a second precipitation of substantially all of the remaining cobalt with small amounts of nickel. This cobalt-containing precipitate has a green to light green color and consists mostly of nickel hydroxide. The residence time for precipitation will depend upon the temperature employed and the desired level to which the cobalt is to be removed; the higher the temperature, the less the residence time. For example, the cobalt in the nickel-containing filtrate can be removed to a level of about 0.02 to 0.04 g./l. in about one minute at the boiling point, in about 15 minutes at about 85° C. to 90° C. and in a few hours at about 60–75° C. The cobalt can be reduced to even lower levels by prolonging still further the residence time. By means of the second precipitation step, the nickel-to-cobalt ratio in the nickel solution can be raised to more than 1000:1. The second precipitate generally contains more nickel than cobalt and is recycled back to the first separation step, or used as the neutralizing agent instead of ammonia when preparing the solution.

Some reactions which may be involved between nickel, cobalt and ammonia in the acid-salt solutions are as follows:

$$H_2SO_4 + 2NH_3 \rightarrow (NH_4)_2SO_4 \qquad (1)$$

$$NiSO_4 + nNH_3 \rightarrow Ni(NH_3)_nSO_4 \qquad (2)$$

$$CoSO_4 + 2NH_3 + 2H_2O \rightarrow Co(OH)_2 + (NH_4)_2SO_4 \qquad (3)$$

$$NiSO_4 + 2NH_3 + 2H_2O \rightarrow Ni(OH)_2 + (NH_4)_2SO_4 \qquad (4)$$

As will be noted, additional ammonium acid-salt is produced by reactions (1), (3) and (4) in addition to any acid-salt that might be present in the feed solution. The amount of ammonium acid-salt produced, such as ammonium sulfate, is dependent upon the free acid concentration, the nickel and cobalt concentrations, and the initial nickel-cobalt-ammine separation is dependent upon the total concentration of that formed by the precipitation of the cobalt and nickel and/or the initial ammonium acid-salt and free acid concentrations.

The effect of the ammonium acid-salt concentration on the separation of cobalt from nickel will be demonstrated as follows.

Example 1

The effect of increasing concentrations of ammonium sulfate on cobalt removal in a nickel-cobalt sulfate feed solution was determined in four batch tests. The nickel and cobalt concentrations in the feed averaged 46.82 grams nickel per liter and 5.2 grams cobalt per liter (Ni/Co=8.88/1).

The mole ratio of total ammonia in solution to nickel in feed was about 5:1. The ammonia was added to a nickel-cobalt sulfate solution containing the ammonium sulfate. The ammonia was reacted with the aqueous nickel-cobalt sulfate for 30 minutes at 35° C. The results for the ammonia addition (Stage 1) are listed in Table 1. The cobalt precipitate was removed by filtration, and the filtrate from Stage 1 was heated to boiling, 92–94° C., and boiled for 15 minutes. The volume of solution during boiling was maintained by the addition of water. The results for the boil precipitation (Stage 2) are listed in Table 1. The amount of ammonium sulfate, that is, the combination of the ammonium sulfate in the feed and that produced by the reaction of ammonia with the cobalt sulfate present in the Stage 1 filtrate, is given in Table 2.

TABLE 1

| Test No. | Ammonium sulfate (NH$_4$)$_2$SO$_4$, grams/liter | Stage [1] | Solution assays, g./l. | | |
|---|---|---|---|---|---|
| | | | Ni | Co | SO$_4$ |
| 1 | 0.0 | Feed | 46.8 | 5.270 | 85.1 |
| | | 1 | 45.2 | 0.440 | 85.4 |
| | | 2 | 40.0 | 0.036 | 84.7 |
| 2 | 5.0 | Feed | 46.3 | 5.211 | 91.0 |
| | | 1 | 46.0 | 0.720 | 89.9 |
| | | 2 | 42.4 | 0.096 | 92.7 |
| 3 | 10.0 | Feed | 47.0 | 5.305 | 97.2 |
| | | 1 | 46.0 | 1.100 | 95.6 |
| | | 2 | 45.2 | 0.260 | 97.1 |
| 4 | 20.0 | Feed | 47.2 | 5.295 | 103.7 |
| | | 1 | 46.4 | 2.100 | 101.9 |
| | | 2 | 44.4 | 0.320 | 100.1 |

[1] Stage 1—After ammonia addition to precipitate cobalt; Stage 2—Solution of Stage 1 boiled after removal of cobalt precipitate to form additional precipitate.

TABLE 2

| Test No. | Ammonium sulfate added, g./l. | Cobalt concentration, g./l. | | Ammonium sulfate in Stage 1, g./l. |
|---|---|---|---|---|
| | | Feed solution | Stage 1 filtrate | |
| 1 | 0.0 | 5.270 | 0.440 | 14.80 |
| 2 | 5.0 | 5.211 | 0.720 | 18.56 |
| 3 | 10.0 | 5.305 | 1.100 | 25.54 |
| 4 | 20.0 | 5.295 | 2.100 | 31.07 |

The ratio of cobalt to nickel in the Stage 1 precipitate was generally in the neighborhood of about 2:1 to 4:1, while the ratio of nickel to cobalt in the Stage 2 precipitate ranged anywhere from about 2:1 to 15:1. As will be noted from Table 2, increasing amounts of ammonium sulfate in the Stage 1 filtrate result in larger amounts of of cobalt being retained in the filtrate. Referring to Test No. 1 in Table 1, it will be noted that the Stage 2 filtrate shows a Ni/Co ratio of about 40.0:0.036 on a grams per liter basis, or a ratio of about 1100:1, thus pointing up the importance of boiling in the Stage 2 step.

However, it will also be noted from Table 1 that the concentration of cobalt in the boil stage filtrate increased from a value of 0.036 gram per liter when the concentration of ammonium sulfate in the feed was zero grams per liter to a value of 0320 gram per liter when the ammonium sulfate in the feed was 20.0 grams per liter, the nickel to cobalt ratio in the Stage 2 filtrate of Table 1 (Test No. 4) being 137:1. The latter value is not desirable for the production of high purity nickel powder.

As illustrative of one embodiment of the foregoing, the following example is given.

Example 2

About 200 ml. of a nickel-cobalt solution having a pH of 2.8 and containing 50.6 g./l. nickel and 4.19 g./l. cobalt were treated with 48 ml. of a concentrated ammonium hydroxide solution (about 260 g./l. $NH_3$) at a temperature of about 30° to 35° C. for 30 minutes. The cobalt-containing precipitate which formed was filtered off, dried and assayed. It weighed 2.8 grams and contained 22.6% nickel and 33.8% cobalt, the cobalt to nickel ratio being about 1.49. The filtrate having been corrected for dilution had a nickel content of 47 g./l. and a cobalt content of 0.257 g./l.

The cobalt precipitation efficiency was about 93% and the nickel co-precipitation about 6 to 8% of the original nickel content. Following the separation of the cobalt precipitate, the filtrate was heated to the boiling point and and maintained at the boiling point for about 3 minutes. The precipitate was filtered off, dried and assayed. It weighed 1.4 grams and contained 49.0% nickel and 3% cobalt. The filtrate, having been corrected for dilution, contained over about 41 g./l. of nickel and about 0.027 to 0.03 g./l. of cobalt, the ratio of nickel to cobalt in the solution being about 1400 to 1.

Example 3

The effect of increasing cobalt concentration at a constant nickel concentration on cobalt removal by the ammonia method in a nickel-cobalt-sulfate feed solution was studied in five batch tests. The average nickel concentration in the feed solution was about 46.1 grams per liter. The cobalt concentration was increased from 4.8 grams per liter in Test No. 5 to 26.8 grams per liter in Test No. 9. No added ammonium sulfate was present in the feed solution. The mole ratio of total ammonia in solution to nickel in the feed solution was about 4:95:1. The ammonia was reacted with the nickel-cobalt-sulfate solution for 30 minutes at 35° C. The results are listed opposite Stage 1 for each test in Table 3. The cobalt precipitate was removed by filtration, and the filtrate from Stage 1 was heated to boiling, 91–93° C. and boiled for 15 minutes (Stage 2). The volume of solution was held constant during boiling by adding water. The results for the boil step are listed opposite Stage 2 in Table 3. The amount of ammonium sulfate produced by the precipitation of cobalt in Stage 1 by the reaction of cobalt sulfate with ammonia to form cobalt hydroxide and ammonium sulfate is given in Table 4.

TABLE 3

| Test No. | Cobalt, grams/ liter | Mole ratio Ni/Co | Stage¹ | Ni | Co | SO₄ |
|---|---|---|---|---|---|---|
| 5 | 4.800 | 9.7/1 | Feed | 46.5 | 4.800 | 83.9 |
|   |       |       | 1    | 45.2 | 0.520 | 82.9 |
|   |       |       | 2    | 38.4 | 0.026 | 80.0 |
| 6 | 5,950 | 7.8/1 | Feed | 46.2 | 5.950 | 85.2 |
|   |       |       | 1    | 45.2 | 0.650 | 83.2 |
|   |       |       | 2    | 38.0 | 0.030 | 82.8 |
| 7 | 7.930 | 5.8/1 | Feed | 46.4 | 7.930 | 88.8 |
|   |       |       | 1    | 45.2 | 0.960 | 85.1 |
|   |       |       | 2    | 41.2 | 0.084 | 84.0 |
| 8 | 12.100 | 3.7/1 | Feed | 45.7 | 12.100 | 94.5 |
|   |       |       | 1    | 44.4 | 1.600 | 92.6 |
|   |       |       | 2    | 45.2 | 0.210 | 97.6 |
| 9 | 26.800 | 1.7/1 | Feed | 45.7 | 26.800 | 118.4 |
|   |       |       | 1    | 42.4 | 2.900 | 109.6 |
|   |       |       | 2    | 40.8 | 0.920 | 109.7 |

Note.—See footnote (1) bottom of Table 1.

TABLE 4

| Test No. | Mole Ni/Co | Cobalt concentrations, g./l. Feed solution | Stage 1 filtrate | Ammonium sulfate produced, g./l. |
|---|---|---|---|---|
| 5 | 9.7/1 | 4.800 | 0.520 | 9.59 |
| 6 | 7.8/1 | 5.950 | 0.640 | 11.90 |
| 7 | 5.8/1 | 7.930 | 0.960 | 15.62 |
| 8 | 3.7/1 | 12.100 | 1.600 | 23.53 |
| 9 | 1.7/1 | 26.800 | 2.900 | 53.56 |

The cobalt concentration increased in the Stage 2 filtrate from 0.026 and 0.030 gram per liter, respectively, in Tests 5 and 6 to 0.920 gram cobalt per liter in Test 9. The cobalt concentration was increased in the solution for each successive test. The result of this increase was due to the increase in the ammonium sulfate concentration in the Stage 1 filtrate. This increased ammonium sulfate concentration had an adverse effect on the cobalt content of the Stage 2 filtrate after boiling.

The effect of the ammonium ion concentration in Stage 1 filtrate during Stage 1 (ammonia stage) and Stage 2 (boil stage) on cobalt retention in solution is shown in FIG. 1. Note the cobalt line for Stage 2 which is substantially below that for Stage 1, thus showing the importance of boiling the solution following removal of the first cobalt precipitate.

An important objective of the ammonia method for nickel-cobalt separation is to produce a nickel to cobalt ratio in the final filtrate greater than about 1000:0. This is demonstrated in Tests 1 (Table 1) and 5 and 6 (Table 3). Therefore, the elimination of the excess ammonium acid-salt, such as ammonium sulfate, which is present in the feed solution and/or which is produced by the precipitation of cobalt and/or by the neutralization of free acid upon the addition of ammonia, is essential for effective nickel-cobalt separation. This can be accomplished by the addition of a hydroxide compound which can remove the excess acid anion by an exchange reaction, such as the removal of sulfate ions by the addition of calcium hydroxide:

$$(NH_4)_2SO_{4(aq)} + Ca(OH)_{2(s)} \rightarrow 2NH_4OH_{(aq)} + CaSO_{4(s)} \quad (5)$$

or by the reaction between a base such as sodium hydroxide:

$$(NH_4)_2SO_{4(aq)} + 2NaOH_{(aq)} \rightarrow 2NH_4OH_{(aq)} + NaSO_{4(aq)} \quad (6)$$

The released ammonium hydroxide can then react with the nickel ammine complex by the reaction:

$$Ni(NH_3)_nSO_4 + 2NH_4OH \rightarrow Ni(NH_3)_{n+2}SO_4 + 2H_2O \quad (7)$$

or be in equilibrium with free aqueous ammonia by the reaction:

$$NH_4OH \rightarrow NH_3 + H_2O \quad (8)$$

The hydroxide compound can be such compounds as calcium hydroxide, barium hydroxide, an anion ion exchange reagent, or a soluble base, such as sodium hydroxide, and the like. The predetermined amount of hydroxide to be added after the ammonia addition is preferably correlated for optimum results to the stoichiometric relation between the hydroxide and the ammonium salt of the salt anion. An excess of hydroxide compound might be need if incomplete reactions occur, e.g., using calcium hydroxide.

The hydroxide added exchanges the hydroxyl ion with the sulfate ion in the ammonium sulfate forming ammonium hydroxide and another compound of the sulfate ion. The extent of the removal or neutralization of the acid anion must be significant to result in effective nickel-cobalt separation by the addition of ammonia to the nickel-cobalt solution.

The use of calcium hydroxide as one form of hydroxyl ion-yielding substance to compensate for the presence of ammonium acid-salt in amounts which tend to inhibit the precipitation of cobalt from solution is demonstrated in the following example.

Example 4

The first stage filtrate was formed by the addition of ammonia to a nickel-cobalt sulfate solution. The starting nickel concentration was 54.6 grams per liter and the cobalt concentration was 18.25 grams per liter (Ni/Co=3/1)

The mole ratio of the total ammonia added to the nickel in the feed sulfate solution was about 4.5:1.

Following the addition of ammonia, ammonium sulfate was produced. The Stage 1 filtrate, after removal of 87.0 percent of the cobalt and 6.62 percent of the nickel, contained 52.6 grams nickel per liter, 2.4 grams cobalt per liter and 39.0 grams ammonium sulfate per liter. If this filtrate is added to Stage 2, the boil stage, the resulting and final filtrate will contain 54.0 grams nickel per liter and 0.6 gram cobalt per liter with a resulting nickel to cobalt mole ratio of 90.0 to one. This is considerably below the desired 1000:1 nickel to cobalt ratio.

Figure 2:
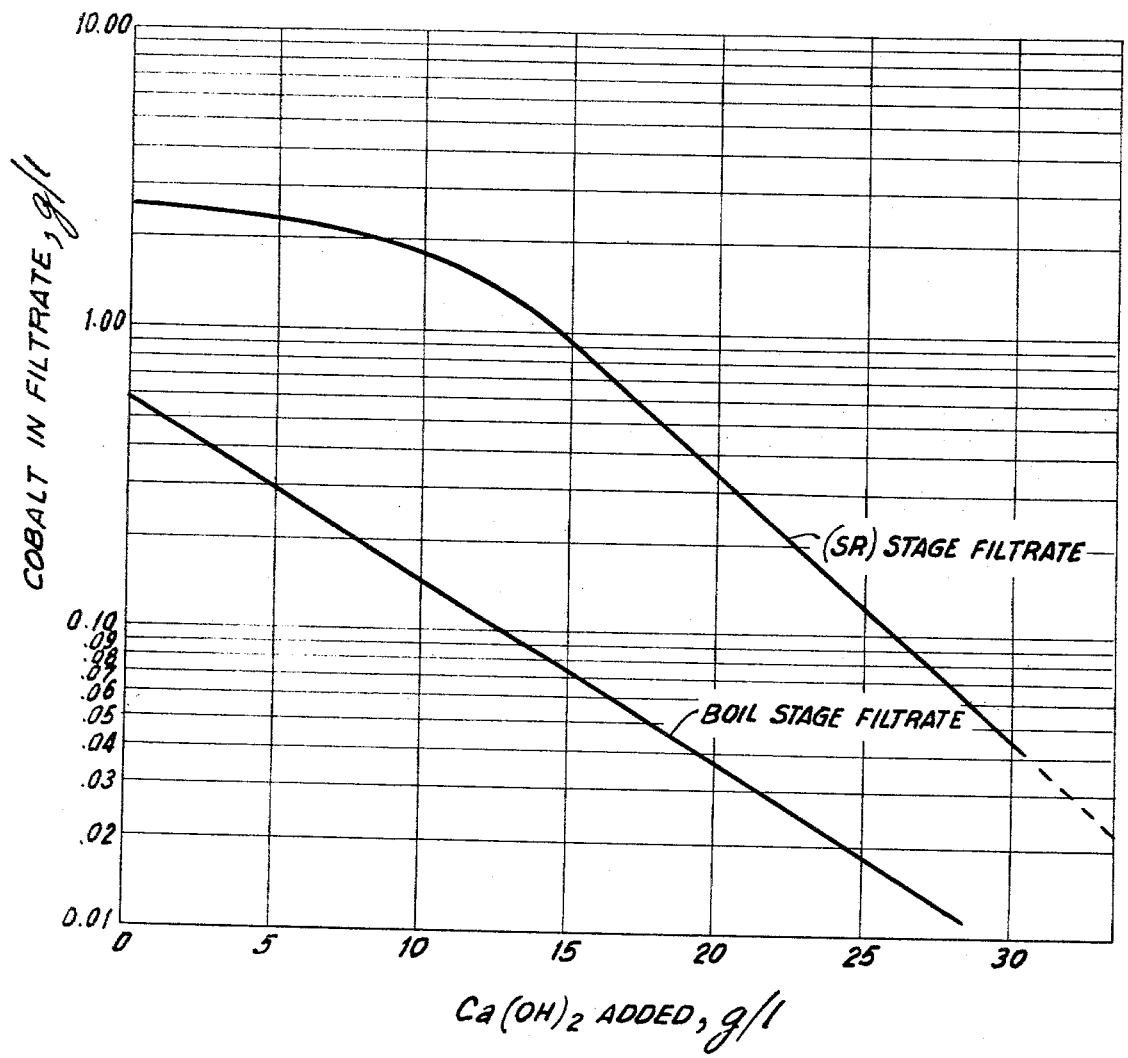
FIG. 2 depicts curves showing the effect of additions of calcium hydroxide on the amount of cobalt retained in the filtrate of the ammonia-treated solution before and after boiling of the solution.
Figure 3:
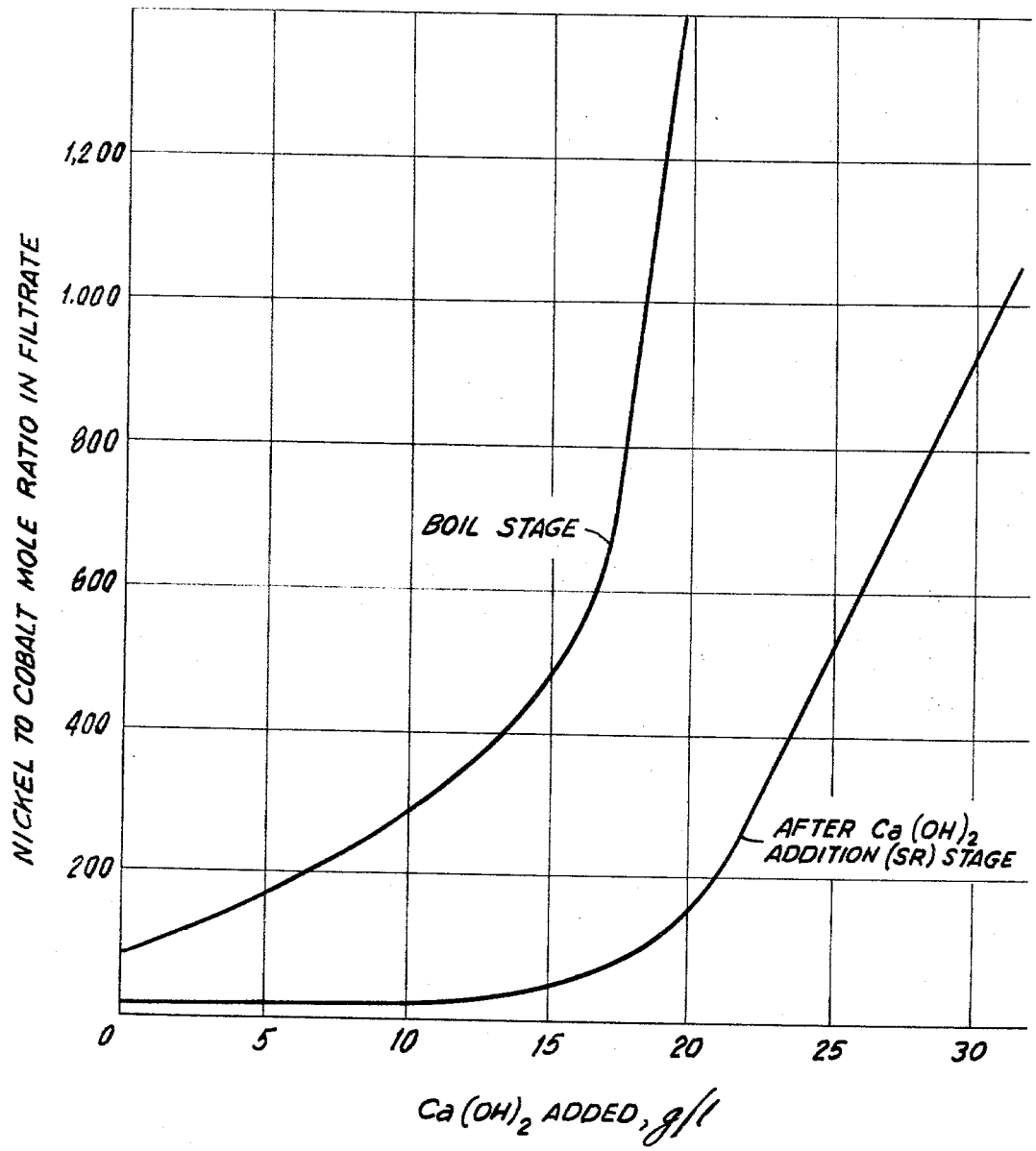
FIG. 3 depicts curves showing the effect of calcium hydroxide additions on the nickel to cobalt ratio in the filtrate of ammonia-treated nickel-cobalt solution, before and after boiling of the solution.

Therefore, the ammonium ion is neutralized to ammonia and the sulfate ion is removed by the addition of calcium hydroxide at a stage (Sulfate Removal, i.e., SR Stage), between the Stage 1 (ammonia addition) and Stage 2 (the Boil stage). The extent of sulfate ion removal in the SR Stage by increasing the amounts of calcium hydroxide is shown in FIG. 2 which shows the results of the increasing addition of calcium hydroxide to the (SR) Stage on the cobalt concentration both in the (SR) Stage and in the boil stage. The nickel to cobalt ratios in the filtrate solutions from these latter two stages are given in FIG. 3. As will be noted, it is possible to achieve the Ni:Co ratio of 1000:1 in the final filtrate by the addition of calcium hydroxide, i.e., after about 31 grams $Ca(OH)_2$ per liter has been added. The resulting solution would contain about 43 grams nickel per liter and 0.040 gram cobalt per liter with the percent of the total nickel in feed precipitated in Stage 1 being 6.5 percent and in the (SR) Stage being between 17 and 22 percent. The nickel to cobalt mole ratio of at least 1000:1 can be achieved after the addition of 18 grams calcium hydroxide per liter to the Stage 1 filtrate, followed by filtration and then the boil stage. In this connection, the resulting solution contained 46 grams nickel per liter and 0.046 gram cobalt per liter. The percent of the total nickel in feed precipitated in all three stages was measured to be 25.5 (ammonia stage 6.5 percent, (SR) Stage 2.5 percent, and the boil stage 16.5 percent) which is recoverable by recycling.

Figure 4:
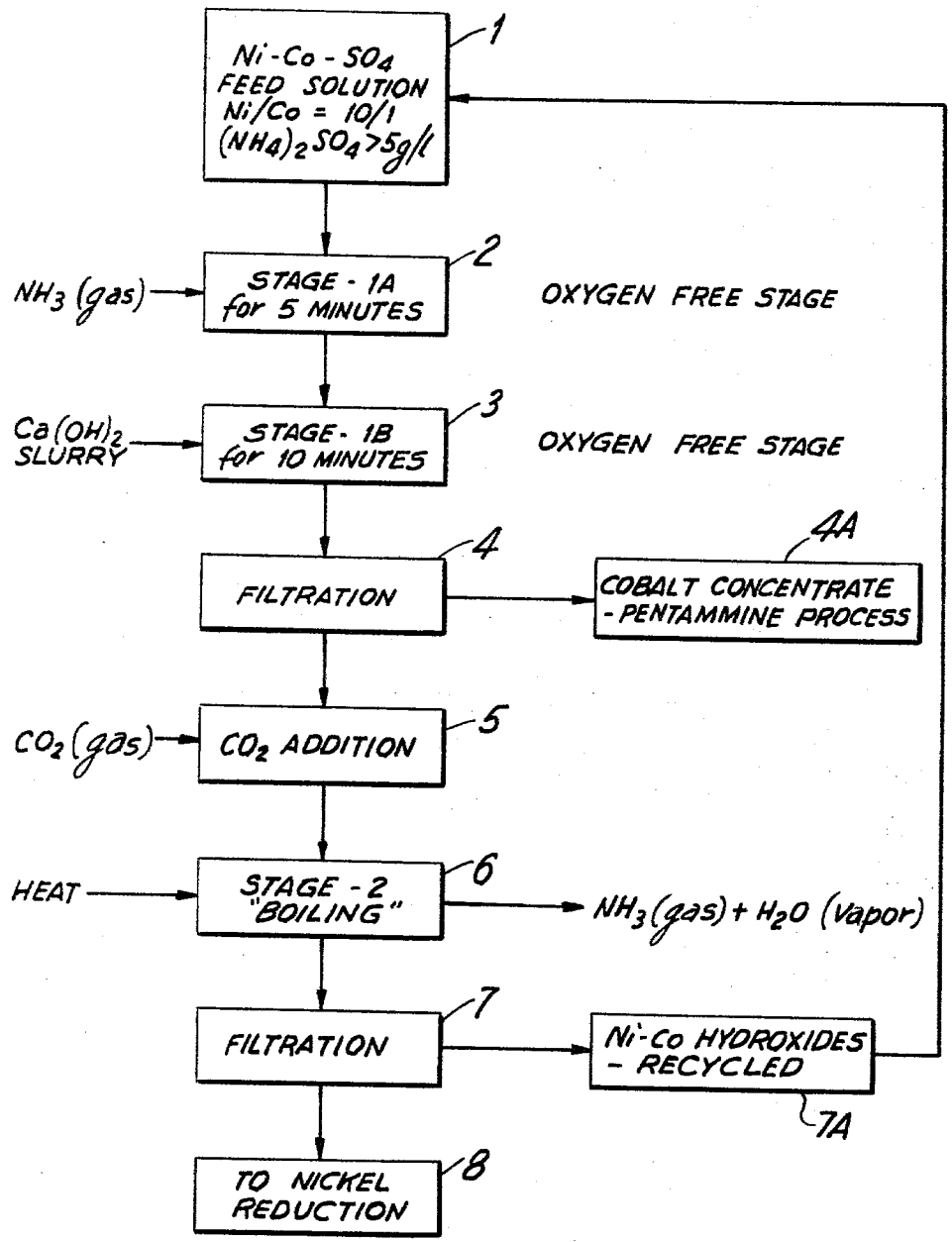
FIG. 4 is a flow sheet illustrating as one embodiment the various steps which may be employed in carrying out the method of the invention.

A flow sheet illustrating the foregoing process is depicted in FIG. 4 in which a feed solution at step 1 having any ratio of nickel to cobalt (e.g. 10:1) and an ammonium sulfate content of over 5 g./l. is subjected to treatment in step 2 referred to as Stage 1A in which the solution is treated with ammonia gas or ammonium hydroxide under substantially oxygen-free conditions for about 5 minutes, the amount of ammonia added corresponding to about 4.5 moles to one mole of nickel. Following the ammonia treatment, a slurry of calcium hydroxide is added at step 3 (Stage 1B), the ammonia-treated solution being held under substantially oxygen-free conditions for about 10 minutes. The amount of calcium hydroxide is calculated according to moles of ammoninium ions of the acid-salt present, and the desired operational acid-salt level.

Thereafter, the solution is filtered at step 4, the cobalt-containing precipitate or concentrate recovered being sent for treatment (step 4A) to the cobalt pentamine process. Following removal of the precipitate, if desired, carbon dioxide gas is injected into the filtrate at step 5 to remove calcium ions from solution as calcium carbonate. At step 6, the filtrate is boiled (Stage 2) following which additional precipitate 7A is formed for recycle as shown, the filtrate at step 7 containing the nickel being then sent for recovery, e.g. to nickel reduction in step 8 of FIG. 4.

The use of anionic exchange resins as a source of hydroxyl ions as neutralizing agent for ammonium ions ($NH_4^+$) produced from an ammonium acid-salt is illustrated in the following example:

Example 5

The resin used was Amberlite IRA–405, a gel type anionic exchanger having the active group

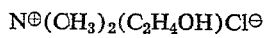
$N^{\oplus}(CH_3)_2(C_2H_4OH)Cl^{\ominus}$

The resin was changed from chloride ($Cl^-$) form to the hydroxide form ($OH^-$) by treatment with sodium hydroxide (NaOH).

The original feed solution contained 45 g./l. of nickel and 22.5 g./l. cobalt. The ammonia was added at a ratio of 4.5 moles of ammonia to one mole of nickel. The resulting filtrate contained 39.6 g./l. nickel, 2.4 g./l. cobalt and 100.2 g./l. of sulfate ions.

The foregoing filtrate was then treated in three equal parts (Tests 10, 11 and 12) with the resin in amounts of 200, 400 and 600 grams (dry chloride form weight) per liter, respectively, as follows:

TABLE 5

| Test No. | Dry weight of resin (g./l.) | Filtrate, g./l. Ni | Filtrate, g./l. Co | Filtrate, g./l. SO₄ | NH₄⁺, moles/liter |
|---|---|---|---|---|---|
| Filtrate | 0 | 39.6 | 2.4 | 100.2 | 0.66 |
| 10 | 200 | 36.4 | 1.3 | 68.3 | 0.139 |
| 11 | 400 | 29.6 | 0.2 | 48.2 | 0.01 |
| 12 | 600 | 25.2 | 0.036 | 31.2 | 0.01 |

The filtrate, prior to treatment with the resin

$[N(CO_3)_2(C_2H_4OH)OH]$ contained 0.66 mole of ammonium ions per liter as ammonium sulfate. The reaction with the aforementioned IR–405 resin in the hydroxyl form expressed as R·OH is as follows:

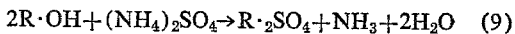
$$2R \cdot OH + (NH_4)_2SO_4 \rightarrow R \cdot 2SO_4 + NH_3 + 2H_2O \quad (9)$$

The anionic resins in the hydroxyl form have a salt-splitting capacity, i.e. the sulfate ions ($SO_4^{-2}$) are adsorbed on the resin in place of the hydroxyl ion, and ammonia is generated from the ammonium ions.

As illustrative of other embodiments of the invention, the following examples are given:

Example 6

A nickel-cobalt acid solution containing 35 g./l. nickel as nickel nitrate and about 4 g./l. cobalt as cobalt nitrate is treated with ammonia at about 30° C. at a ratio of 6 moles of ammonia to one mole of nickel to produce a cobalt-containing precipitate which is separated from the solution and the resulting filtrate then treated with an amount of sodium hydroxide sufficient to reduce the ammonium ion concentration of the acid-salt to below 0.1 m.p.l. Thereafter, the solution is heated to a temperature between 90° C. and 100° C. for about ten minutes to precipitate additional cobalt which is separated from the filtrate for recycling into the process, the resulting nickel solution having a nickel to cobalt ratio of over 1000:1.

Example 7

A nickel-cobalt acid solution containing about 40 g./l. nickel as nickel chloride and 10 g./l. cobalt as cobalt chloride is treated with ammonia at about 25° C. at a ratio of about 5 moles of ammonia to one mole of nickel. A cobalt-containing precipitate is obtained which is separated from the solution and the resulting filtrate then treated with a slurry of calcium hydroxide calculated to reduce the ammonium ion concentration of the acid-salt to below 0.05 m.p.l. The solution is boiled for 15 minutes and the additional cobalt-containing precipitate formed is removed. Any excess calcium ions in filtrate are removed by injecting $CO_2$ into the filtrate to form calcium carbonate. The ratio of nickel to cobalt in the solution is at least 1000:1.

Summarizing the foregoing, the invention provides a method of separating cobalt from nickel-cobalt leach solutions for producing a highly enriched nickel product low in cobalt by adding ammonia in an amount sufficient to complex the nickel and retain it in solution while precipitating out a substantial portion of the cobalt. The separation of cobalt from the nickel is optimized by controlling the amount of acid-salt in solution to an amount corresponding to below 0.3 mole of ammonium ions per liter and more preferably below 0.1 mole per liter.

The amount of ammonia added to the solution may range from about 2 to 6 moles per mole of nickel and preferably from about 3 to 5 moles per mole of nickel. To assure a solution with low ammonium ion concentration of the acid-salt, a hydroxyl ion-yielding substance is added which is calculated based on stoichiometry to react with and neutralize the acid-salt. The preferred hydroxyl ion-yielding substance is selected from the group consisting of anionic exchange reagents, alkali metal hydroxides and alkaline earth metal hydroxides.

Thus, in carrying out the method, the improvement comprises in first adding ammonia to the nickel-cobalt acid solution in an amount sufficient to form a cobalt-containing precipitate, thereby forming an ammonium acid-salt by reaction with the anion of a free acid present and the acid anion corresponding to the amount of cobalt and nickel precipitated while maintaining substantially the bulk of the nickel in solution as ammine complexes. To the solution is then added an amount of a hydroxyl ion-yielding substance sufficient to convert substantially the ammonium acid-salt to aqueous ammonia, water and a neutral salt, the amount added being sufficient to decrease the ammonium ion concentration of the acid-salt to below 0.3 m.p.l. and preferably below 0.1 m.p.l. The cobalt-containing precipitate is then removed from the solution to provide a nickel filtrate from which a highly enriched nickel product can be recovered. The solution is preferably further enriched in nickel by boiling it after removing the first precipitate, the boiling step resulting in additional cobalt-containing precipitate which, because of the nickel content, is generally recycled back into the process.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a method of separating cobalt from nickel-cobalt acid solutions whereby to produce an enriched nickel product low in cobalt, the improvement which comprises, adding ammonia to said solution in an amount ranging from about 2 to 6 moles of ammonia to one mole of nickel in solution whereby to form a cobalt-containing precipitate and a soluble ammonium acid-salt while maintaining substantially the bulk of the nickel in solution and while controlling the amount of ammonium acid-salt formed in the solution to a level corresponding to below 0.3 mole of ammonium ions per liter to assure a high yield of cobalt in the precipitate, separating the cobalt-containing precipitate from said solution, heating said solution to an elevated temperature of at least about 50° C. whereby to form an additional cobalt-containing precipitate, separating said precipitate from said solution, and then recovering a highly enriched nickel product from said solution.

2. The method of claim 1, wherein the concentration of ammonium ions corresponding to the ammonium acid-salt in the solution is controlled at below 0.3 mole per liter by contacting said solution with an amount of hydroxyl ion-yielding substance selected from the group consisting of anionic exchange reagents, alkali metal hydroxides and alkaline earth metal hydroxides sufficient to maintain the ammonium ion concentration to below said concentration.

3. The method of claim 2, wherein the amount of the hydroxyl ion-yielding substance used is sufficient to maintain the ammonium ion concentration of the ammonium acid-salt to below 0.1 mole per liter and wherein the amount of ammonia added to the solution ranges from about 3 to 5 moles of ammonia per mole of nickel.

4. The method of claim 1, wherein the solution treated is a nickel-cobalt acid solution selected from the group consisting of sulfuric acid, nitric acid, hydrochloric acid and acetic acid.

5. In a method of separating nickel from nickel-cobalt acid solutions whereby to produce a highly enriched nickel product, the improvement which comprises,
adding ammonia to said solution in an amount ranging from about 2 to 6 moles of ammonia to one mole of nickel in solution whereby to form a cobalt-containing precipitate,
thereby forming an ammonium acid-salt by reaction with the anion of any free acid present and the acid anion corresponding to the amount of cobalt precipitated while maintaining substantially the bulk of the nickel in solution,
thereafter adding to said solution containing said cobalt-containing precipitate an amount of an hydroxyl ion-yielding substance selected from the group consisting of anoinic exchange resins, alkali metal hydroxides and alkaline earth metal hydroxides sufficient to convert substantially said ammonium acid-salt to aqueous ammonia, water and a neutral salt,
the amount of said hydroxyl ion-yielding substance being at least sufficient to maintain the ammonium ion concentration of said ammonium acid-salt to below 0.3 mole per liter,
separating the cobalt-containing precipitate from the solution,
and then recovering a highly enriched nickel product from said solution.

6. The method of claim 5, wherein following the removal of the cobalt-containing precipitate from the solution, the solution is then heated to an elevated temperature of at least about 50° C. whereby to produce additional cobalt-containing precipitate, separating said precipitate from said solution and then recovering a highly enriched nickel product from said solution.

7. The method of claim 5, wherein the amount of the hydroxyl ion-yielding substance is calculated based on stoichiometry to maintain the ammonium ion concentration of the ammonium acid-salt to below 0.1 mole per liter and wherein the amount of ammonia added to the solution ranges from about 3 to 5 moles of ammonia per mole of nickel.

8. The method of claim 5, wherein the solution treated is a nickel-cobalt acid solution selected from the group consisting of sulfuric acid, nitric acid, hydrochloric acid and acetic acid.

9. A method of producing a high purity nickel product which comprises,
providing a nickel-cobalt acid solution having a nickel to cobalt ratio ranging from about 1:1 to 100:1,
adding to said solution a predetermined amount of ammonia ranging from about 2 to 6 moles of ammonia to one mole of nickel in solution sufficient to raise the pH to about 8 to 11 and to form a cobalt-containing precipitate,
thereby forming an ammonium acid-salt by reaction with the anion of any free acid present and the acid anion corresponding substantially to the amount of cobalt precipitated while maintaining substantially the bulk of the nickel in solution, thereafter adding to said solution containing said cobalt-containing precipitate an amount of an hydroxyl ion-yielding substance selected from the group consisting of anion exchange reagents, alkali metal hydroxides and alkaline earth metal hydroxides sufficient to convert substantially said ammonium acid-salt to aqueous ammonia, water and a neutral salt, the amount of said hydroxyl ion-yielding substance being sufficient to maintain the ammonium ion concentration of said ammonium acid-salt to below 0.3 mole per liter, separating said cobalt precipitate from said solution, heating said solution to a temperature from about 50° C. to the boiling point to effect the formation of a second precipitate, and removing said second precipitate whereby to provide a high purity nickel solution characterized by a high nickel to cobalt ratio.

10. The method of claim 9, wherein the concentration of ammonium ions of said ammonium acid-salt in said solution is less than about 0.1 mole per liter.

11. The method of claim 9, wherein the second precipitate is recycled for dissolution with fresh nickel-cobalt solution and wherein a high purity nickel product is recovered from the high purity nickel solution.

12. A method of producing a high purity nickel product which comprises, providing a nickel-cobalt acid solution containing about 10 to 75 g./l. nickel and 0.1 to 30 g./l. nickel, adding to said solution a predetermined amount of ammonia over the range of about 2 to 6 moles of ammonia to one mole of nickel to raise the pH to about 8 to 11 and to form a cobalt-containing precipitate, thereby forming an ammonium acid-salt by reaction with the anion of any free acid present and the acid anion corresponding substantially to the amount of cobalt precipitated while maintaining substantially the bulk of the nickel in solution, thereafter adding to said solution containing said cobalt-containing precipitate an amount of an hydroxyl ion-yielding substance selected from the group consisting of anionic exchange reagents, alkali metal hydroxides and alkaline earth metal hydroxides sufficient to convert substantially said ammonium acid-salt to aqueous ammonia, water and a neutral salt, the amount of said hydroxyl ion-yielding substance being sufficient to maintain the ammonium ion concentrates of said ammonium acid-salt to below 0.1 mole per liter, separating said cobalt precipitate from said solution, heating said solution to a temperature from about 50° C. to the boiling point to effect the formation of a second precipitate, and removing said second precipitate whereby to provide a high purity nickel solution characterized by a high nickel to cobalt ratio.

13. The method of claim 12, wherein the amount of ammonia added on a molar basis ranges from about 3 to 5 moles of ammonia to one mole of nickel.

14. The method of claim 13, wherein the nickel-cobalt acid solution is selected from the group consisting of sulfuric acid, nitric acid, hydrochloric acid and acetic acid.

15. The method of claim 12, wherein the second cobalt precipitate is recycled for dissolution in the starting nickel-cobalt solution prior to adding ammonia in said solution.

References Cited

UNITED STATES PATENTS

| | | | |
|---|---|---|---|
| 2,647,820 | 8/1953 | Forward | 75—119 |
| 2,711,956 | 6/1955 | Schaufelberger | 75—119 |

FOREIGN PATENTS

| | | | |
|---|---|---|---|
| 824,470 | 12/1959 | Great Britain | 23—117 |
| 746,780 | 3/1956 | Great Britain | 75—119 |

OTHER REFERENCES

Grothe: "Metall und Erg," vol. 30, No. 22, November 1933, pp. 449–455 (pages 1–24 of translation of above article also relied upon).

HERBERT T. CARTER, Primary Examiner

U.S. Cl. X.R.

423—143; 75—119, 108, 115